Sept. 25, 1934.   R. F. STEENECK   1,974,590
SPRING CONNECTION
Filed Aug. 9, 1932   2 Sheets-Sheet 1

INVENTOR
Robert F. Steeneck
BY
ATTORNEYS.

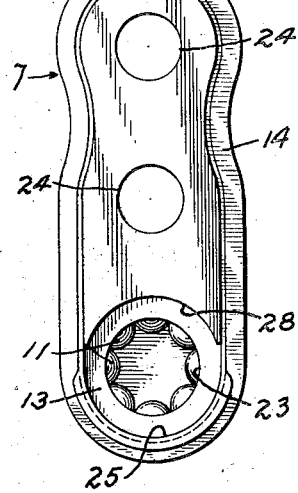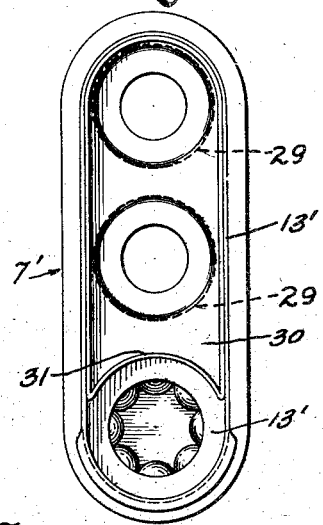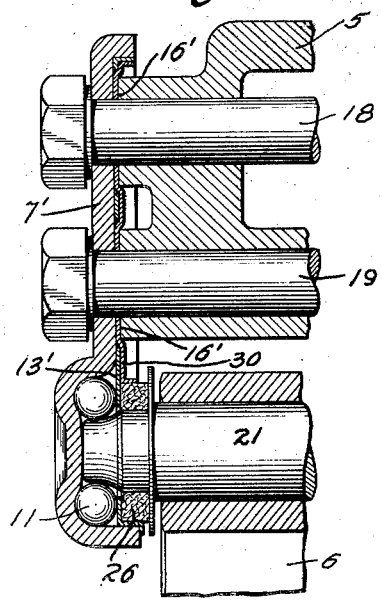

Patented Sept. 25, 1934

1,974,590

UNITED STATES PATENT OFFICE 1,974,590

SPRING CONNECTION

Robert F. Steeneck, Detroit, Mich., assignor to The Fafnir Bearing Company, New Britain, Conn., a corporation of Connecticut Application August 9, 1932, Serial No. 628,055

9 Claims. (Cl. 267—54)

My invention relates to a spring connection and particularly to a so called hinge connection or bracket for connecting one end of a load carrying vehicle spring to the vehicle frame.

It is a general object of the invention to provide an improved spring connection of relatively few and simple parts, cheap to manufacture, sturdy and effective in use, and not likely to get out of order.

Other objects and features of invention will be hereinafter pointed out, or will become apparent on a reading of the specification.

In the drawings which show, for illustrative purposes only, preferred forms of the invention—

Fig. 3 is an inside view in elevation of one of the links and associated parts shown in Figs. 1 and 2;

Fig. 4 is a view similar to Fig. 3 but illustrating a modification;

Fig. 5 is a fragmentary, sectional view similar to Fig. 2, but illustrating the link and associated parts shown in Fig. 4.

Figure 1:
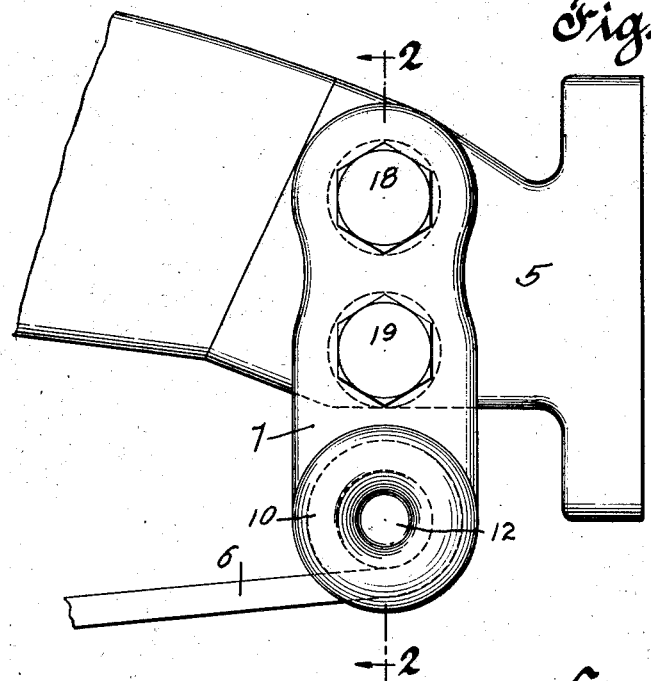
Fig. 1 is a fragmentary view in side elevation of a spring and frame hingedly connected and illustrating features of the invention.

In said drawings, the part 5 as shown is a block-like member rigidly secured to the adjacent end of a side sill 5' which is, as usual in automobile construction, of channeled form. 6 indicates a spring part to be hingedly connected thereto. In the form shown in Figs. 1, 2 and 3, I employ a pair of connecting or link members 7—8 preferably formed of stamped up sheet metal. Each link is provided with a bearing raceway 9 preferably formed by cupping up the link as indicated at 10. Anti-friction bearing members, such as balls 11, bear on the raceways 9 and may be positioned by means of a spacer in a well known manner or by filling the raceway completely so that the balls act as arches for each other to prevent radial inward displacement. Again, the center of the cupped portion 10 may be struck inwardly as indicated at 12, so as to provide a groove-like raceway whereby inward displacement of the balls will be prevented whether or not the raceway is completely filled and whether or not a ball spacer is employed. The balls may be held in place against axial displacement by means of a sheet metal plate 13 in position to be engaged by the balls.

Figure 2:
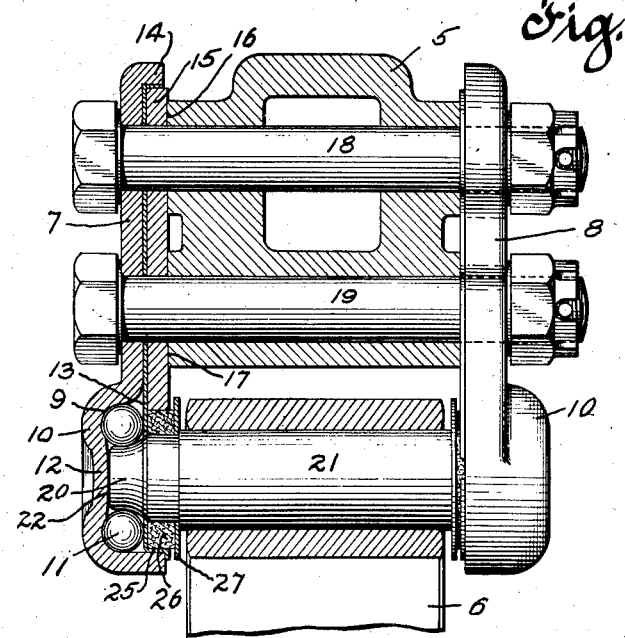
Fig. 2 is a partial sectional view taken substantially in the plane of the line 2—2 of Fig. 1.

The plate 13 preferably is flanged and housed within the link which may have a substantially continuous peripheral flange 14 extending therearound for strengthening the same. A spacer plate 15 may likewise be housed within the channeled link and may serve to back up the sheet metal plate 13. As illustrated, the block 5 has spaced bearing surfaces on each side forming lands 16—17, against which the links, or, more properly speaking, as shown in Fig. 2, the spacer plates 15 may abut so as to definitely support and space the opposed bracket links 7—8 apart. The links are secured to the block 5 as by means of through bolts 18—19, projects angularly therefrom, and when in place forms an efficient and durable bracket for the vehicle spring end 6.

The spring 6 in the form shown carries bearing raceway means complementary to the raceways 9, and, in the form shown, such raceways 20 are formed on the ends of a pin 21 suitably secured in the eye of the spring. The complementary raceways 9—20 are preferably so formed that the anti-friction bearing members sustain the radial loads between the spring and frame, and the extreme ends 22 of the pin 21 either abut or are in position to abut the links or parts of the raceways thereof so as to take the end thrust loads between the frame and spring. As illustrated, the pin 21 likewise acts as a spacer for the cupped ends of the links, and, in general, the links will be drawn up by means of the through bolts 18—19 to a definite position solid against the frame block 5, and the links may be slightly sprung by means of the spacing and bearing pin 21. Thus, there is little likelihood of a rattling or pounding action between the side links and the pin 21.

Lubricant may be retained on, and foreign matter excluded from, the anti-friction bearing surfaces, partly by the sheet metal plate 13 which is apertured as indicated at 23 for the passage of the pin 21 and is apertured as at 24 for the passage of the through bolts 18—19. Within the channeled or cupped portion 25 of the plate 13 there may be a felt or similar ring 26 which may be backed up and held in place axially by means of a washer 27 on the pin 21. The spacer plate 15 may be rounded out as indicated at 28, to back up the dust ring 26 at the side opposite the cupped or flanged portion 25 of the plate 13.

In the form shown in Figs. 4 and 5, the parts are generally the same as the parts shown in Figs. 1, 2 and 3, but there are certain modifications, as will be described: In Figs. 4 and 5, each link 7' may be of substantially the same form as heretofore described and may carry a sheet metal plate 13' flanged up and carried within the channel of the link 7', as heretofore described. The plate 13' however, is preferably provided with enlarged apertures 29—29, and a second sheet metal plate 30 corresponding in general to the spacer 15 is flanged up and fits within the channeled plate 13'. The channeled plate 30 is cupped in so as to engage the link within the enlarged apertures 29—29 in the plate 13, as will be clear from Figs. 4 and 5. The through bolts serve to hold the plates 13'—30 rigidly in place between the link and the frame, and such plates are preferably carried by the links themselves. In order to compensate for the lesser thickness of the plates 13—30, the frame block 5 is made wider by offsetting the bosses more than shown in Fig. 2 whereby the lands 16'—16 at opposite sides of the frame are farther apart so as to properly space the links. The plate 30 is flanged up, as indicated at 31 (Fig. 4), so as to back up the felt ring 26. Otherwise the construction and operation may be substantially the same as described in connection with Figs. 1, 2 and 3.

It will be seen that I have provided a very durable and sturdy connection or bracket for a vehicle spring end, the same being comprised of but few parts all readily and cheaply manufactured and applied or assembled. This construction has the further advantage that the horn of the vehicle frame may be extended forwardly as shown in Fig. 1 for the purpose of providing a solid frame support for a bumper. This is permitted by reason of the fact that in the construction shown the bracket projects angularly from the block 5 and does not interfere therewith.

While the invention has been described in considerable detail and specific forms illustrated, it is to be understood that various changes and modifications may be made within the scope of the invention as defined in the appended claims.

I claim:

1. In a spring bracket, a vehicle frame, a spring, a pair of side plates rigidly secured to the opposite sides of one of the sills of said frame, each of said side plates comprising a relatively flat plate having a bearing raceway cup struck out from one end thereof, each of said plates having an angular marginal flange extending around the same, bearing means with raceways complementary to said link raceways, antifriction bearing members interposed between said complementary raceways to take radial loads, the ends of said last mentioned bearing means being positioned to engage said bearing cups so as to take at least a portion of the end thrusts between said cups independently of said anti-friction bearing members.

2. In a spring connection, a spring, a vehicle frame sill, a block carried thereby and having oppositely projecting bosses, a pair of flat plates secured to said bosses at opposite sides thereof so as to be spaced apart thereby and free of said sill, a portion of each of said plates extending angularly from said block and having a cupped portion struck out therefrom, a bearing pin for a vehicle spring projecting beyond the sides thereof and into said cup members, and anti-friction bearing members for supporting pin means and cup members in a radial direction, said side plates being of substantially uniform thickness throughout.

3. In a spring bracket for a vehicle frame end, a sill, a block at the end thereof, raised spaced lands on each side thereof, a spring, a pair of side plates secured to said block on said lands, said side plates each comprising a pressed metal member having a channel shaped portion throughout its length, a spacer plate in one end of said channel and interposed between said side plates and said lands, each of said side plates projecting angularly from said block, and means for anti-frictionally connecting said spring and the angularly projecting portions of said plates relatively to each other.

4. In a spring connection, a frame, a spring, a pair of side plates secured to said frame and projecting angularly therebeyond, the projecting portions of said plates having bearing cups thereon, anti-friction bearing members in said bearing cups, means for assisting in retaining said anti-friction bearing members in said cups comprising a plate extending over said anti-friction bearing members and interposed between said plates and frame so as to be rigidly held in place, said spring having means to engage said anti-friction bearing members, for the purpose described.

5. In a spring connection, a frame, a spring, side plates rigidly secured to said frame and extending angularly therebeyond, the projecting portions of said side plates having bearing raceway means and plate means extending over anti-friction bearing members of said raceway means, said plate means being interposed between said side plates and said frame and being held in place thereby, and means for anti-frictionally supporting said spring through said anti-friction bearing members.

6. In a spring connection, a frame, a spring, a pair of side plates rigidly secured to said frame and projecting angularly therebeyond, the projecting portions of said side plate having raceways for anti-friction bearing members, anti-friction bearing members thereon, means for anti-frictionally supporting the spring by said anti-friction bearing members, and lubricant retaining and dust excluding means including a pair of plates interposed between said side plates and said frame.

7. In a spring connection, a spring, a frame, pin means carried by the spring and projecting beyond the sides thereof, a pair of side plates having parts in abutting relation to said pin means to assist in spacing said side plates apart at one end, means for securing said side plates rigidly to the frame, the other end of said side plates being held in spaced apart relation thereby, and anti-friction bearing members interposed between said pin means and said side plates, for the purpose described.

8. In a vehicle, a sill, a block at the end thereof, laterally extending lands on each side of said block to the rear of the outer end of the same, a spring bracket comprising two side plates rigidly mounted on said lands at opposite sides of said block and projecting downwardly therefrom back of said outer end, a cupped recess in the projecting ends of each of said plates, a bearing pin for a vehicle spring, a raceway in each cupped recess and a complementary raceway on each pin end, and anti-friction devices in said raceways.

9. In a spring connection, a frame, a pair of plates secured to said frame at opposite sides thereof, each of said plates having a bearing raceway thereon, anti-friction bearing members on said raceways, and means for sustaining said anti-friction bearing members against displacement in one direction including a sheet metal plate extending partially over said anti-friction bearing members and being held between said plates and said frame, a spring having raceways complementary to said first mentioned raceways and engaging said anti-friction bearing members.

ROBERT F. STEENECK.